United States Patent
Mason et al.

(10) Patent No.: US 9,185,941 B2
(45) Date of Patent: Nov. 17, 2015

(54) SYNTHETIC INSULATION WITH MICROPOROUS MEMBRANE

(75) Inventors: Vanessa Mason, Rexford, NY (US); Joseph Rumiesz, Voorheesville, NY (US)

(73) Assignee: PRIMALOFT, INC., Latham, NY (US)

( * ) Notice: Subject to any disclaimer, the term of this patent is extended or adjusted under 35 U.S.C. 154(b) by 0 days.

(21) Appl. No.: 13/482,458

(22) Filed: May 29, 2012

(65) Prior Publication Data

US 2012/0238169 A1 Sep. 20, 2012

Related U.S. Application Data

(63) Continuation-in-part of application No. 10/732,692, filed on Dec. 9, 2003, now abandoned.

(51) Int. Cl.
*B32B 27/12* (2006.01)
*A41D 31/02* (2006.01)

(52) U.S. Cl.
CPC ............... *A41D 31/02* (2013.01); *B32B 27/12* (2013.01); *A41D 2400/22* (2013.01); *Y10T 428/24998* (2015.04); *Y10T 442/3065* (2015.04); *Y10T 442/3854* (2015.04); *Y10T 442/59* (2015.04); *Y10T 442/60* (2015.04); *Y10T 442/615* (2015.04); *Y10T 442/619* (2015.04); *Y10T 442/674* (2015.04)

(58) Field of Classification Search
CPC ...... B32B 7/00; B32B 27/00; B32B 2437/00; B32B 2307/724; B01D 2239/00; D06N 2209/12; D06N 2209/123; D04H 1/06; D04H 1/00; D04H 3/00; D04H 5/00; D04H 13/00

USPC .................................................. 442/327, 394
See application file for complete search history.

(56) References Cited

U.S. PATENT DOCUMENTS

| | | | |
|---|---|---|---|
| 3,387,307 A | 6/1968 | Blatz | |
| 3,625,790 A | 12/1971 | Ayres | 156/93 |
| 3,953,566 A | 4/1976 | Gore | 264/288 |
| 4,034,417 A * | 7/1977 | Ellis | 2/81 |
| 4,187,390 A | 2/1980 | Gore | 174/102 |
| 4,194,041 A | 3/1980 | Gore et al. | 428/315 |
| 4,230,838 A | 10/1980 | Foy et al. | 525/408 |
| 4,292,746 A | 10/1981 | Delaney | 36/83 |

(Continued)

FOREIGN PATENT DOCUMENTS

| | | |
|---|---|---|
| DE | 27 37 756 A | 3/1979 |
| DE | 196 32 312 A1 | 8/1996 |

(Continued)

OTHER PUBLICATIONS

Dictionary.com definition of "breathable."*

(Continued)

*Primary Examiner* — Peter Y Choi
(74) *Attorney, Agent, or Firm* — Heslin Rothenberg Farley & Mesiti P.C.

(57) ABSTRACT

An insulation package and method of formation including a functional layer, a breathable water repellant insulating layer, and a highly breathable microporous membrane layer having a network of pores. The functional fabric, the highly breathable insulating layer and the microporous membrane layer are laminated to one another to form a waterproof breathable insulated fabric.

22 Claims, 2 Drawing Sheets

(56) References Cited

U.S. PATENT DOCUMENTS

| | | | | |
|---|---|---|---|---|
| 4,493,870 | A | 1/1985 | Vrouenraets et al. | 428/245 |
| 4,494,246 | A | 1/1985 | Tillbrook | 2/2.1 |
| 4,539,256 | A | 9/1985 | Shipman | |
| 4,588,635 | A | 5/1986 | Donovan | 428/288 |
| 4,662,006 | A | 5/1987 | Ross, Jr. | |
| 4,698,372 | A * | 10/1987 | Moss | 521/145 |
| 4,891,407 | A | 1/1990 | Mitchell | 525/104 |
| 4,945,125 | A | 7/1990 | Dillon et al. | 527/427 |
| 4,992,327 | A | 2/1991 | Donovan et al. | 428/296 |
| 5,003,902 | A | 4/1991 | Benstock et al. | 112/440 |
| 5,021,280 | A | 6/1991 | Farnworth et al. | 428/102 |
| 5,026,591 | A | 6/1991 | Henn et al. | 428/198 |
| 5,036,551 | A | 8/1991 | Dailey et al. | |
| 5,043,209 | A | 8/1991 | Boisse et al. | 428/233 |
| 5,066,683 | A | 11/1991 | Dillon et al. | 521/54 |
| 5,072,598 | A | 12/1991 | Dibrell | 62/259.3 |
| 5,086,629 | A | 2/1992 | Dibrell | 62/259.3 |
| 5,088,116 | A | 2/1992 | Gould | 2/82 |
| 5,157,058 | A | 10/1992 | Dillon et al. | 521/134 |
| 5,187,814 | A | 2/1993 | Gold | 2/160 |
| 5,204,156 | A * | 4/1993 | Lumb et al. | 428/96 |
| 5,260,360 | A * | 11/1993 | Mrozinski et al. | 524/95 |
| 5,362,553 | A | 11/1994 | Dillon et al. | 428/246 |
| 5,389,430 | A | 2/1995 | Yilgor et al. | 428/246 |
| 5,399,418 | A | 3/1995 | Hartmanns et al. | 428/218 |
| 5,437,900 | A | 8/1995 | Kuzowski | 428/36.1 |
| 5,458,516 | A | 10/1995 | Uglene et al. | |
| 5,461,122 | A | 10/1995 | Yilgor et al. | 525/474 |
| 5,490,290 | A | 2/1996 | Gold | 2/159 |
| 5,503,907 | A | 4/1996 | Gessner et al. | 428/198 |
| 5,521,273 | A | 5/1996 | Yilgor et al. | 528/66 |
| 5,542,124 | A | 8/1996 | Grilliot et al. | 2/81 |
| 5,568,656 | A | 10/1996 | Kim | 2/164 |
| 5,571,592 | A * | 11/1996 | McGregor et al. | 428/71 |
| 5,634,212 | A | 6/1997 | Gilbert | 2/158 |
| 5,662,972 | A | 9/1997 | Shimada et al. | 428/35.7 |
| 5,692,936 | A | 12/1997 | Yamaguchi et al. | 442/63 |
| 5,814,178 | A | 9/1998 | Jacobs | 156/290 |
| 5,840,775 | A | 11/1998 | Howard et al. | |
| 5,914,184 | A | 6/1999 | Morman | 428/315.9 |
| 5,947,944 | A | 9/1999 | Hetzler et al. | 604/366 |
| 5,996,146 | A | 12/1999 | McPherson | 5/413 |
| 6,015,764 | A | 1/2000 | McCormack et al. | 442/370 |
| 6,045,900 | A | 4/2000 | Haffner et al. | 428/315.9 |
| 6,100,208 | A | 8/2000 | Brown et al. | 442/364 |
| 6,156,421 | A | 12/2000 | Stopper et al. | 428/315.5 |
| 6,171,689 | B1 | 1/2001 | Kaytor et al. | 428/315.5 |
| 6,187,696 | B1 * | 2/2001 | Lim et al. | 442/77 |
| 6,319,864 | B1 | 11/2001 | Hannigan et al. | 442/281 |
| 6,352,948 | B1 | 3/2002 | Pike et al. | 442/384 |
| 6,368,859 | B1 | 4/2002 | Atala | 435/395 |
| 6,415,449 | B2 | 7/2002 | Duplock | |
| 6,444,302 | B1 | 9/2002 | Srinivas et al. | 428/315.5 |
| 6,449,787 | B1 | 9/2002 | Thorne | 5/413 |
| 6,511,927 | B1 * | 1/2003 | Ellis et al. | 442/77 |
| 6,910,235 | B2 | 6/2005 | Lack et al. | |
| 2002/0104576 | A1 | 8/2002 | Howland | |
| 2002/0106956 | A1 * | 8/2002 | Howland | 442/208 |
| 2003/0215617 | A1 | 11/2003 | Shehata et al. | |
| 2004/0116022 | A1 * | 6/2004 | Langley et al. | 442/289 |

FOREIGN PATENT DOCUMENTS

| | | |
|---|---|---|
| EP | 0 345 730 B1 | 12/1989 |
| EP | 0 696 654 A1 | 2/1996 |
| EP | 1 196 285 | 4/2002 |
| EP | 0 942 826 B1 | 9/2003 |
| GB | 1 465 343 | 5/1974 |

OTHER PUBLICATIONS

Opposition against European Patent 1 691 976 (EP 04813126.9) filed with European Patent Office on Aug. 16, 2012 by W.L. Gore & Associates GmbH.

Excerpt from "Appretur", published by "VEB Fachbuchverlag Leipzig", 1. Edition 1990, in German. Referred to as Document D11 in opposition papers.

Trademark Electronic Search System search for PRIMALOFT.

Laminate, http://en.wikipedia.org/w/index.php?title=Laminate&oldid=300618552 (last visited Jul. 6, 2009).

Dictionary Definition of Laminate, The American Heritage Dictionary of the English Language, Fourth Edition, copyright 2009, 3 pages.

Wikipedia, *Thermal Insulation*, http://en.wikipedia.org/wiki/Thermal_insulation (as of Mar. 18, 2009, at 14:48 GMT).

Dictionary Definitions of Insulation from American Heritage Dictionary, WordNet, Merriam-Webster's Medical Dictionary, Webster's Revised Unabridged Dictionary, 2 pages. (no date).

* cited by examiner

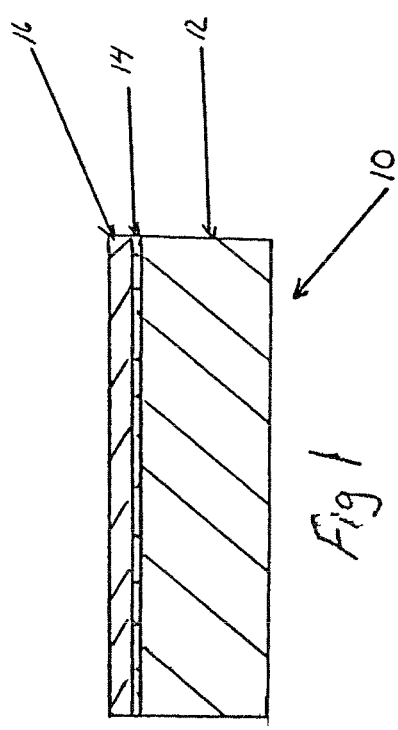

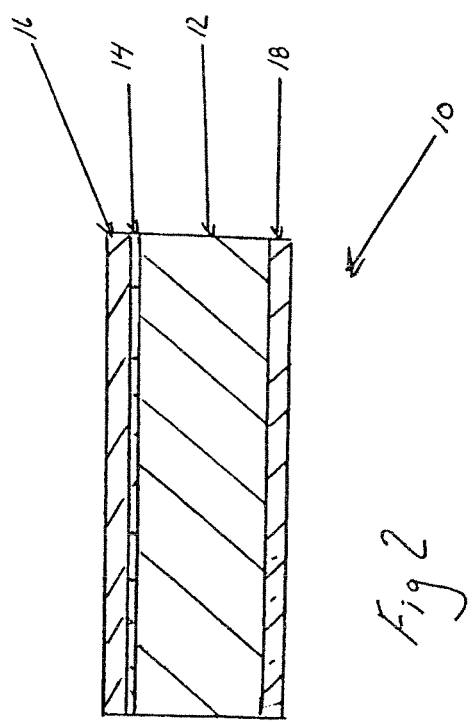

SYNTHETIC INSULATION WITH MICROPOROUS MEMBRANE

This application is a continuation-in-part of U.S. patent application Ser. No.10/732,692 filed Dec. 9, 2003, the disclosure of which is incorporated herein by reference.

BACKGROUND OF THE INVENTION

1. Field of the Invention

The present invention is directed to waterproof breathable insulation material and in particular such material for use in outdoor clothing and boots.

2. Description of the Related Art

Outdoor enthusiasts have continually demanded technically advanced gear to protect themselves from the elements. This demand resulted in the development of several waterproof, breathable fabric constructions where the fabric is typically laminated to thin films or membranes. Waterproof breathable fabrics have been used in performance garments for many decades and have proven to be a preferred performance component. Both the prevention of water reaching the body from outside the clothing, and the removal of vapor produced by the body are of great importance to the wearer in terms of comfort. However, the disadvantage to such fabrics has always been that although they are classified as being breathable, they do not offer significant moisture vapor transport. Further, most breathable fabrics tend to have very limited insulating properties. Still further, fabrics laminated to certain types of membrane types tend not be very flexible and generate noise when in use. Accordingly, despite their claims most waterproof breathable fabrics tend to be less breathable than desired, offer limited insulating properties so that they must be used in conjunction with some form of insulating material, and require the user to endure their stiff and noisy nature.

Insulating materials are often used in conjunction with or incorporated into performance garments to provide for thermal protection. However, most insulating materials do not provide for water repellency or alternatively provide water repellency at the cost of a corresponding diminution in thermal protection. PrimaLoft® insulation, as described in U.S. Pat. Nos. 4,992,327 and 4,588,635 and incorporated herein by reference, is unique to the synthetic insulation world in that it offers superior water repellency in addition to the thermal performance indicative of the micro and fine fiber construction.

However, PrimaLoft® insulation has been primarily used as a replacement for natural down with the added benefit that it is waterproof. Alternatively, PrimaLoft® batt has incorporated into clothing manufacture where it is a separate insulating layer. Often it is mechanically secured to other layers of woven or non-woven material for example through quilting. However, the PrimaLoft® insulation by itself does not have sufficient structural integrity, or aesthetic appearance to suffice as both an insulating material and an outer garment layer.

Another element of many waterproof breathable fabrics are monolithic membrane films, which are used to impart a breathable barrier to the fabric. Monolithic membranes promote the permeation of water vapor through the use of a hydrophilic polymer layer which absorbs the water next to skin and transmits it to the external environment.

Unfortunately, monolithic films typically experience significant swelling of the hydrophilic layer which significantly alters the vapor removal characteristics of the film and the comfort for the user. Further, although this type of membrane also has a very high tear strength, which is generally favorable in performance fabrics, this also results in extraordinary stiffness in a garment that is usually not viewed as a positive attribute.

Accordingly, there is a need for an waterproof, breathable, insulation material which provides superior water repellency or waterproofing characteristics coupled with superior vapor removal characteristics which will not swell and has sufficient tear strength, but which is not unduly stiff or noisy for the wearer.

SUMMARY OF THE INVENTION

One aspect of the present invention is directed to an insulation package having a functional fabric layer, a highly breathable microporous membrane layer having a network of pores, and a breathable water repellant insulating layer. The layers being laminated to one another to form a waterproof breathable insulated fabric.

In another embodiment of the present invention the insulating layer is a breathable water repellant insulating layer is in the form of a cohesive fiber structure, which structure comprises an assemblage of:

(a) from 70 to 95 weight percent of synthetic polymeric microfibers having a diameter of from 3 to 12 microns; and (b) from 5 to 30 weight percent of synthetic polymeric macrofibers having a diameter of from 12 to 50 microns.

The present invention is also directed to a method of forming a waterproof insulation package. The steps include providing a first layer of functional fabric, a second layer of microporous membrane, and a third layer of breathable water repellant insulation. Further the first layer is bonded to the second layer, and the second layer to the third.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated.

BRIEF DESCRIPTION OF THE DRAWINGS

For a more complete understanding of the invention, reference is made to the following description and accompanying drawings, in which:

FIG. 1 is a cross-sectional view of a waterproof insulation package according the present invention; and FIG. 2 is a cross-sectional view of another waterproof breathable insulation package according the present invention.

DETAILED DESCRIPTION OF THE PREFERRED EMBODIMENT

Turning now to the drawings, the present invention is directed towards an insulation package 10 shown generally in FIG. 1 that is both waterproof and breathable. As shown in FIG. 1 an insulating package 10 is comprised of an insulating material 12, a microporous membrane 14, and a functional fabric 16. The insulating material 12, the microporous membrane 14 and the functional fabric 16 are bonded to one another, preferably through known lamination techniques. In a preferred embodiment, the laminated package 10 consists of PrimaLoft® insulation as the insulating material 12 and any woven, non-woven, fleece, or other fabric structure as the functional fabric 16 adhered or laminated to the surface of the microporous membrane 14, which is itself laminated to the PrimaLoft® insulation. In certain situations it may be desirable to add an additional layer of functional fabric or a liner to the nonmicroprous membrane side of the insulation material 12.

A microporous membrane 14 is preferred because it is has a highly breathable interconnected network of micropores that can be manipulated. The breathability and air permeability properties of the microporous membrane 14 are selectively defined through stretching and manipulation of the membrane. This stretching alters the original membrane pore size. Further, the microporous membrane lends itself to applications using lamination techniques.

In application a pore network of the microporous membrane is constructed so that the work path and size of the pores permit the optimal transfer of moisture vapor while still inhibiting the transfer of water, yet not at the level acceptable for consideration as a waterproof, breathable membrane.

One of the advantages of the microporous membrane 14 is that it does not absorb water or exhibit swelling. Monolithic membranes of the prior art are typically polyurethane based function through the solubility of water molecules in the membrane layer. As a result, despite their general resistance to tearing, they are less desirable as they are prone to swelling. Such swelling is known to alter the hydrophilic properties of the monolithic membranes.

In contrast, microporous membranes function through the diffusion of moisture vapor across the pores. Typical pore size is, for example, between 1 and 8 μm. Because of this pore size, the microporous membrane of the present invention is not itself considered waterproof or hydrophobic. Further, microporous membranes are typically formed of polytetraflourethylene or other polymeric material with a low crystalinity (generally less than 30%). In addition the polymeric material may be blended with an inorganic filler with a particle size of 0.5-5 μm. A microporous membrane may generally have a thickness of approximately between 30 and 50 μm. Importantly, such microporous membranes do not experience the swelling common of monolithic membranes.

Further, by laminating the insulating layer 12 to a microporous membrane 14 the resistance to tearing of the microporous membrane, which is generally less than that of monolithic membranes, is greatly increased. In addition, the stiffness of the combination is significantly less than that created by the bonding of an insulating material to a monolithic membrane.

To further enhance the waterproof nature of the insulation package the functional layer 16 may be coated with a durable water repellant treatment or cire coating.

According to one aspect of the present invention, the insulating layer 12 is a synthetic fiber thermal insulator material in the form of a cohesive fiber structure, which structure comprises an assemblage of:

(a) from 70 to 95 weight percent of synthetic polymeric microfibers having a diameter of from 3 to 12 microns; and (b) from 5 to 30 weight percent of synthetic polymeric macrofibers having a diameter of from 12 to 50 microns, wherein at least some of the fibers are bonded at their contact points, the bonding being such that the density of the resultant structure is within the range 3 to 16 kg/m$^3$ (0.2 to 1.0 lb/ft$^3$), the bonding being effected without significant loss of thermal insulating properties of the structure compared with the unbonded assemblage.

Microfibers and macrofibers for use in the present invention may be manufactured from polyester, nylon, rayon, acetate, acrylic, modacrylic, polyolefins, spandex, polyaramids, polyimides, fluorocarbons, polybenzimidazols, polyvinylalcohols, polydiacetylenes, polyetherketones, polyimidazols, and phenylene sulphide polymers such as those commercially available under the trade name RYTON.

The bonding may be effected between at least some of the macrofibers to form a supporting structure for the microfibers, or may be between both macrofibers and microfibers at various contact points. The macrofibers may be selected from the same material or from a variety of materials and may be either the same material as the microfibers or different.

In one advantageous embodiment of the invention microfibers are formed from polyethylene terephthalate and the macrofibers are selected from the polyethylene terephthalate or a polyaramid, such, for example, as that commercially available under the trademark "Kevlar".

The macrofibers can be monofibers, i.e., fibers having a substantially uniform structure or they may be multi-component fibers having a moiety to facilitate fiber to fiber bonding. The fiber may be a fiber mixture in which at least 10% by weight comprises macrofibers of a lower melting point thermoplastic material to assist the fiber to fiber bonding. In a further embodiment of the invention the macrofibers may be a fiber mixture comprising multi-component macrofibers and a monocomponent macrofiber capable of bonding one with the other and/or with the microfibers.

In another embodiment of the present invention the macro component fiber may be a mix or blend of macrofibers having different properties, for example, a macrofiber mix may comprise two or more different fibers such as a polyester fiber to give the desired bonding and a "Kevlar" fiber to give stiffness. The proportion of stiffening fiber to bonding fiber may be varied to provide different properties subject to the requirement that the proportion of bondable fibers is sufficient for the macrofiber structure to provide an open support for the microfibers as hereinafter described.

Some materials, such as, for example, polyphenylene sulphide fibers, aromatic polyamides of the type commercially available under the trade name "APYIEL", and polyimide fibers such as those manufactured by Lenzing AG of Austria, exhibit flame retardant properties or are nonflammable. Such materials can, therefore, confer improved flame or fire resistant properties on manufactured products containing the materials in accordance with the present invention.

The bonding of the fibers of the insulting layer 12, in accordance with one aspect of the invention, is preferably, principally between the fibers of the macrofiber component at their contact points. The purpose of the macrofiber to macrofiber bonding is to form a supporting structure for the micro-fiber component, said supporting structure contributing significantly to the mechanical properties of the insulating material. By bonding the macrofibers, the macrofibers maintain an open bonded fiber structure within which the microfibers can be accommodated. Alternatively, the macrofibers and/or the microfibers may be bonded at their contact points.

Any means of bonding between the macrofibers may be employed such, for example, as by the addition of solid, gaseous or liquid bonding agents or preferably through the application of heat to cause the lower temperature fiber component to melt and fuse at contact points.

The method of bonding the components of the insulating layer 12 is not critical, subject only to the requirement that the bonding should be carried out under conditions such that neither fiber component loses its structural integrity. It will be appreciated by one skilled in the art that any appreciable change in the macro-or microfibers during bonding will affect the thermal properties adversely; the bonding step needs, therefore, to be conducted to maintain the physical properties and dimensions of the fiber components and the assemblage as much as possible.

The thermal insulating properties of the bonded insulating layer 12 are preferably substantially the same as, or not significantly less than, thermal insulating properties of a similar unbonded assemblage.

In a particular embodiment of the present invention bonding within the insulating layer 12 may be affected by heating the fibers for a time and at a temperature sufficient to cause the fibers to bond. Such heating period may be at a temperature of from about 125° C. (257° F.) to 225° C. (437° F.) for a period of the order of 1 minute to 10 minutes and preferably at a temperature of from about 140° C. (284° F.) to 200° C. (392° F.) for a period of about 3 to 7 minutes; these periods are, of course, dependent upon the materials of the fiber component mix.

PrimaLoft® as described above is suitable for lamination applications. When produced as a batt, a surface on the batting structure can be created such that it is conducive to being laminated with an outer shell fabric for use as a garment or sleeping bag or with a macroporous membrane as described herein. Lamination techniques require a substantially smooth surface on the insulation for application and sustainability of adhesion to a fabric.

This smooth surface can be created through processes known in the art such as IR calendaring, hot plate calendaring, heated rollers, resin coatings, and/or unique hot air oven processing (unique being defined as temperature and air flow manipulation). In addition to surface treatments, the internal structure of the batting needs to be well bonded in order to maintain the integrity of the structure through repeated use and laundering of a laminated article without delamination.

Although in the preferred embodiment a Primaloft® insulation, and in particular a batt material formed of Primaloft® is used, it should be understood that other insulating materials can be used without departing from the scope of the present invention.

Experimental Data

This insulation package 10 provides water protection above 2.0 psi hydrostatic pressure according to AATCC Test Method 127 titled, "Water Resistance: Hydrostatic Pressure Test." It is typically accepted in the outdoor garment industry that any fabric with a hydrostatic pressure capability above 2.0 psi be considered waterproof by definition. AATCC is the abbreviation for the American Association of Textile Chemists and Colorists. AATCC 127 is a test method that measures the resistance of a fabric to the penetration of water under hydrostatic pressure and is applicable to all types of fabrics. One surface of the test specimen is subjected to pressurized water where the pressure is increasing at a constant rate until three points of leakage are observed on the other side of the specimen. In one experiment, the insulation package 10 utilizing a Primaloft® batt as the insulating layer 12 was found to have a resistance to hydrostatic pressure that exceeded 185 cm-$H_2O$ or 2.63 psi. Accordingly, the insulation package 10 was found to exhibit water resistance characteristics that far exceeded that necessary to be considered waterproof.

Another test performed on the insulation package was a determination of the Water Vapor Transmission Rate (WVTR). This was done in accordance with ASTME 96-00 Procedure E. The WVTR is a test to determine the amount of water vapor that can pass through the fabric over a given period.

For example, one known microporous membrane often cited in the prior art as a basis for comparison and control in experiments is CELGARD® 2500 which is known to have a WVTR of 5000 g/m$^2$/24 hrs.

Breathable outerwear garments of the prior art such as that described in Example 1 of U.S. Pat. No. 6,100,208 having a first layer of multicomponent fibers a second layer of multicomponent fibers and a water impermeable barrier in between formed of low density polyethylene have been shown to have a MVTR of 3465 g/m$^2$/24 hrs. However, the garment described in the '208 patent does not provide an insulating layer as that of the present invention. It would be expected that the addition of an insulating layer would decrease the WVTR of the outdoor fabric.

The test of the insulating package of the present invention was performed at 37.8° C. and at 90% relative humidity. In this test a sample of laminated SUPPLEX fabric, microporous membrane material, and Primaloft® insulation, as described in the present invention achieved at WVTR of 3521 g/m$^2$/24 hrs. This is significant because the test sample provides an insulating layer not present in the two examples described above, yet has greater MVTR than the un-insulated laminate outdoor fabric and nearly as great an MVTR as the microporous membrane by itself. As such the insulating package of the present invention demonstrates that a wearer of clothing constructed using the insulation package should expect to remain in reasonable comfort despite significant athletic activity.

It has thus been shown that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

What is claimed is:

1. An insulation package comprising:
   at least one functional fabric layer on an exterior side of the insulation package;
   a breathable water repellant insulating layer on an interior side of the insulation package; and
   a breathable, air permeable polytetrafluoroethylene microporous membrane layer having a network of pores, disposed between said at least one functional fabric layer and said breathable water repellant insulating layer, wherein the size of the pores is between about 1 and about 8 µm;
   wherein the functional fabric, microporous membrane layer and the insulating layer, are laminated to one another throughout the entire insulation package to form a waterproof breathable insulated fabric; and
   wherein the insulation package has a Water Vapor Transmission Rate (WVTR) of about 3521 g/m$^2$/24 hrs.

2. The insulation package of claim 1, wherein at least one of the at least one functional fabric layers is a water resistant fabric.

3. The insulation package of claim 2, wherein the functional fabric layer is coated with a cire coating.

4. The insulation package of claim 1, further comprising a second functional fabric layer.

5. The insulation package of claim 4, wherein the second functional fabric is laminated to the insulating layer on the non-membrane side.

6. The insulation package of claim 1, wherein the size of a pore in the network of pores is defined by stretching the microporous membrane.

7. The insulation package of claim 1, wherein said insulation package permits vapor transfer and inhibits water transfer.

8. The insulation package of claim 1, wherein the breathable water repellant insulating layer is nonwoven and comprises fibers selected from the group consisting of microfibers, macrofiber, natural fibers, and blends thereof.

9. The insulation package of claim 1, wherein the breathable water repellant insulating layer is woven and comprises fibers selected from the group consisting of microfibers, macrofiber, natural fibers, and blends thereof.

10. The insulation package of claim 1, wherein the breathable water repellant insulating layer has a cohesive fiber structure comprising an assemblage of:
 (a) from 70 to 95 weight percent of spun and drawn, synthetic polymeric microfibers having a diameter of from 3 to 12 microns; and
 (b) from 5 to 30 weight percent of synthetic polymeric macrofibers having a diameter of 12 to 50 microns.

11. The insulation package of claim 1, wherein the breathable water repellant insulating layer formed as a batt having a smooth surface compatible for lamination techniques.

12. The insulation package of claim 11, wherein the smooth surface is formed by at least one process selected from the group consisting of IR calendaring, hot plate calendaring, using heated rollers, resin coatings, and hot air oven processing.

13. The insulation package of claim 1, wherein the functional fabric is selected from the group consisting of fleece, woven, and nonwoven fabrics.

14. A method of forming a waterproof insulation package according to claim 1, the method comprising the steps of:
 providing a first layer of functional fabric on an exterior side of the insulation package;
 providing a second layer of polytetrafluoroethylene microporous membrane disposed between said at least one functional fabric layer and said breathable water repellant insulating layer;
 providing a third layer of breathable water repellant insulating layer on an interior side of the insulation package;
 bonding the first layer to said second layer; and
 bonding the second layer to the third layer.

15. The method of claim 14, further comprising the step of forming the third layer as a batt.

16. The method of claim 15, further comprising the step of forming a smooth surface on said batt.

17. The method of claim 14, wherein the bonding of the first and second layers is a lamination process.

18. The method of claim 14, wherein the bonding of the second and third layers is a lamination process.

19. The method of claim 14, further comprising the step of providing a second functional fabric layer.

20. The method of claim 19, wherein the second functional fabric layer is laminated to the breathable water repellant insulating layer.

21. An insulation package comprising:
 at least one functional fabric layer on an exterior side of the insulation package;
 a breathable water repellant insulating layer on an interior side of the insulation package; and
 a breathable, air permeable, non-waterproof polytetrafluoroethylene microporous membrane layer having a network of pores, disposed between said at least one functional fabric layer and said breathable water repellant insulating layer;
 wherein the functional fabric, microporous membrane layer and the insulating layer, are laminated to one another throughout the entire insulation package to form a waterproof breathable insulated fabric; and
 wherein the insulation package has a Water Vapor Transmission Rate (WVTR) of about 3521 g/m$^2$/24 hrs.

22. An article comprising the insulation package according to claim 1.

* * * * *